United States Patent
Parks et al.

(10) Patent No.: US 10,678,263 B2
(45) Date of Patent: Jun. 9, 2020

(54) METHOD AND APPARATUS FOR POSITION ERROR DETECTION

(71) Applicant: GM GLOBAL TECHNOLOGY OPERATIONS LLC, Detroit, MI (US)

(72) Inventors: Jeffrey S. Parks, Ann Arbor, MI (US); Loren J. Majersik, Salt Lake City, UT (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 173 days.

(21) Appl. No.: 15/680,370

(22) Filed: Aug. 18, 2017

(65) Prior Publication Data

US 2019/0056750 A1 Feb. 21, 2019

(51) Int. Cl.
| | |
|---|---|
| *G05D 1/02* | (2020.01) |
| *B60W 30/00* | (2006.01) |
| *B62D 15/02* | (2006.01) |
| *G01C 21/34* | (2006.01) |
| *B62D 5/04* | (2006.01) |
| *G01C 21/30* | (2006.01) |

(52) U.S. Cl.
CPC .......... *G05D 1/0274* (2013.01); *B60W 30/00* (2013.01); *B62D 5/0484* (2013.01); *B62D 15/025* (2013.01); *G01C 21/30* (2013.01); *G01C 21/34* (2013.01); *G01C 21/3407* (2013.01); *G05D 2201/0213* (2013.01)

(58) Field of Classification Search
CPC ...... G01C 21/30; G01C 21/34; G05D 1/0274; G05E 2201/0213
See application file for complete search history.

(56) References Cited

U.S. PATENT DOCUMENTS

| | | | | |
|---|---|---|---|---|
| 8,473,144 B1 * | 6/2013 | Dolgov | ............... | B60W 30/095 701/28 |
| 2002/0013647 A1 * | 1/2002 | Kawazoe | ................. | B62D 1/28 701/41 |
| 2004/0201672 A1 * | 10/2004 | Varadarajan | ........... | H04N 7/183 348/148 |
| 2005/0225477 A1 * | 10/2005 | Cong | ................. | B60K 31/0008 342/70 |
| 2010/0082195 A1 * | 4/2010 | Lee | ....................... | B62D 15/025 701/25 |
| 2010/0191461 A1 * | 7/2010 | Zeng | ................... | B60W 40/072 701/532 |
| 2012/0283907 A1 * | 11/2012 | Lee | ..................... | B60T 8/17557 701/31.9 |
| 2015/0353082 A1 * | 12/2015 | Lee | ....................... | B60W 30/09 701/41 |
| 2016/0027176 A1 * | 1/2016 | Zeng | ........................ | G06T 7/80 348/148 |

\* cited by examiner

*Primary Examiner* — Donald J Wallace
(74) *Attorney, Agent, or Firm* — Cantor Colburn LLP

(57) ABSTRACT

A method and apparatus for determining a route of a vehicle are provided. The method includes activating fail operative steering in response to detecting an electronic power steering (EPS) failure, determining a length of a lane map fusion ring, calculating a desired route based on a line of the lane map fusion ring if the determined length is greater than a first predetermined distance, and calculating desired route based on offset information and heading information of the lane map fusion ring and curvature information and curvature derivative information calculated from map data if the determined length is less than the first predetermined distance.

19 Claims, 2 Drawing Sheets

METHOD AND APPARATUS FOR POSITION ERROR DETECTION

INTRODUCTION

Apparatuses and methods consistent with exemplary embodiments relate to determining a route for a vehicle on a road. More particularly, apparatuses and methods consistent with exemplary embodiments relate to determining a route for a vehicle and steering a vehicle along a route.

SUMMARY

One or more exemplary embodiments provide a method and an apparatus that determine a route for a vehicle. More particularly, one or more exemplary embodiments provide a method and an apparatus that determine a route for a vehicle in a situation where insufficient information is being provided by a vehicle sensor.

According to an exemplary embodiment, a method for determining a route of a vehicle is provided. The method includes activating fail operative steering in response to detecting an electronic power steering (EPS) failure, determining a length of a lane map fusion ring, calculating a desired route based on a line of the lane map fusion ring if the determined length is greater than a first predetermined distance, and calculating the desired route based on offset information and heading information of the lane map fusion ring and curvature information and curvature derivative information calculated from map data, if the determined length is less than the first predetermined distance. The first predetermined distance may be 20 meters.

The calculating the desired route may include calculating the curvature information by calculating an average curvature of map data for a second predetermined distance in front of a vehicle and dividing the average curvature in half. The calculating the desired route may also include calculating the curvature derivative information by calculating a slope of map data for a second predetermined distance in front of the vehicle and dividing the slope by six.

The map data may include an array of curvature information for 10 meter intervals in front of the vehicle.

The calculating the slope of the map data may be performed based on an equation:

$$\text{Slope} = \frac{N\Sigma XY - \Sigma X * \Sigma Y}{N\Sigma x^2 - (\Sigma x)^2},$$

where N is a number of points, x is a distance from the vehicle, and y is map curvature information.

The detecting the EPS failure may include at least one from among detecting a loss of communication with the EPS module and detecting that the EPS module is reporting an internal failure. The detecting the EPS failure may further include running a diagnostic to detect the EPS failure.

The curvature information and the curvature derivative information may include coefficients used to control steering of the vehicle.

According to an exemplary embodiment, an apparatus that determines a route is provided. The apparatus includes at least one memory comprising computer executable instructions; and at least one processor configured to read and execute the computer executable instructions. The computer executable instructions may cause the at least one processor to activate fail operative steering in response to detecting an electronic power steering (EPS) failure, determine a length of a lane map fusion ring, calculate a desired route based on a line of lane map fusion ring if the determined length is greater than a first predetermined distance, and calculate the desired route based on offset information and heading information of lane map fusion ring and curvature information and curvature derivative information calculated from map data, if the determined length is less than the first predetermined distance. The first predetermined distance may be 20 meters.

The computer executable instructions may cause the at least one processor to calculate the desired route based on the curvature information by calculating an average curvature of map data for a second predetermined distance in front of a vehicle and dividing the average curvature in half. The computer executable instructions may further cause the at least one processor to calculate the curvature derivative information by calculating a slope of map data for a second predetermined distance in front of the vehicle and dividing the slope by six.

The map data may include an array including curvature information for 10 meter intervals in front of the vehicle.

The computer executable instructions cause the at least one processor to calculate $$\text{Slope} = \frac{N\Sigma XY - \Sigma X * \Sigma Y}{N\Sigma x^2 - (\Sigma x)^2},$$

the slope of the map data based on an equation: where N is a number of points, x is a distance from the vehicle, and y is map curvature information.

The computer executable instructions may cause the at least one processor to detect the EPS failure by performing at least one from among detecting a loss of communication with the EPS module and detecting that the EPS module is reporting an internal failure.

The apparatus may further include a camera, and the computer executable instructions may cause the at least one processor to detect the EPS failure further by running a diagnostic to detect the EPS failure.

The curvature information and the curvature derivative information may include coefficients used to control steering of a vehicle.

The apparatus may further include a steering actuator, the computer executable instructions may cause the at least one processor to control the steering actuator according to calculated the desired route.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
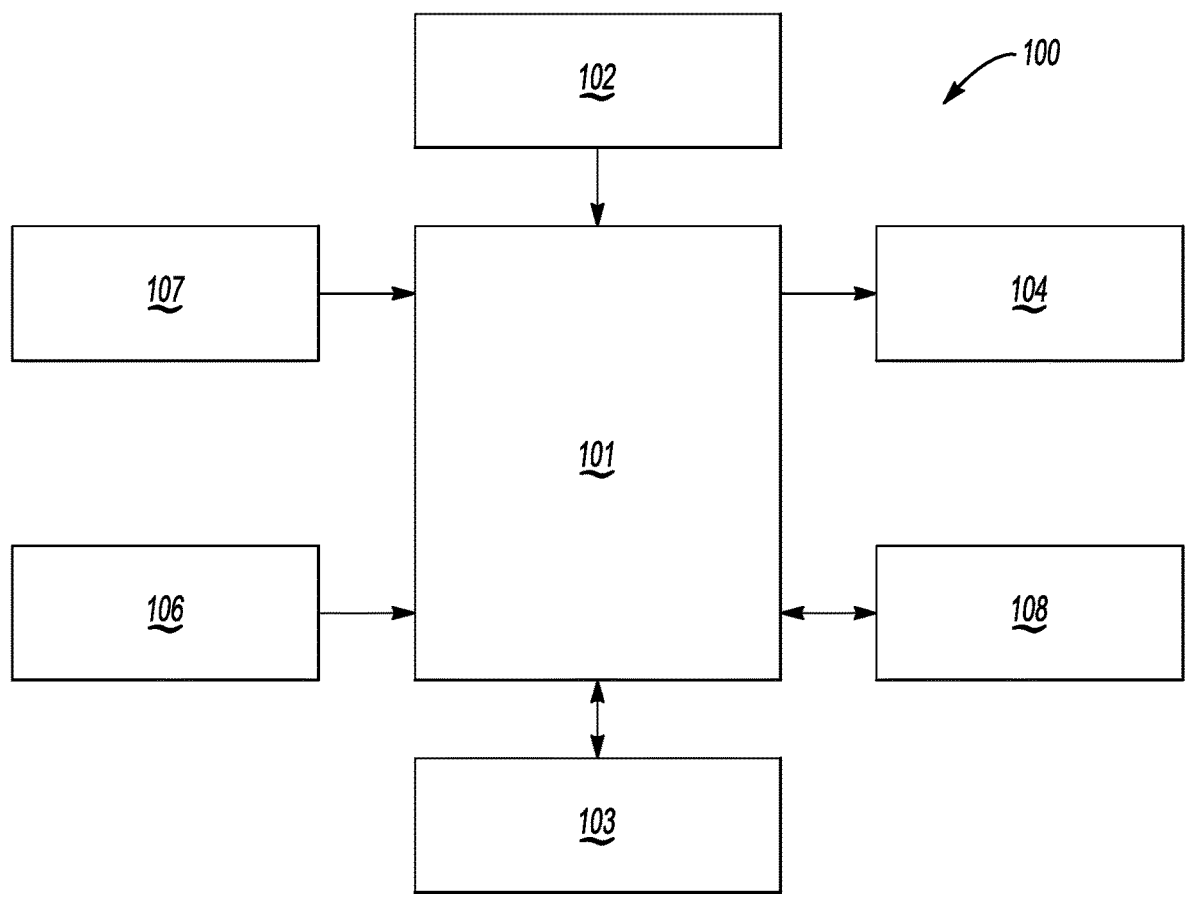
FIG. 1 shows a block diagram of an apparatus that determines a route according to an exemplary embodiment.

An apparatus and method for determining a route will now be described in detail with reference to FIGS. 1 and 2 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles are being equipped with communication devices and sensors that are capable of providing information used to determine a position of the vehicle and to detect conditions of an environment around a vehicle. The sensors provide information on conditions or features of a location of a vehicle and this information may be used to control the vehicle, determine a route for a vehicle, or to assist an operator of a vehicle. In one example, communication devices may provide global navigation information that includes a position of a vehicle. In another example, sensors may provide imaging information of an area around a vehicle. In yet another example, mapping information about a route that a vehicle is traveling along may be provided from storage or a communication device. However, the sensors and communication devices may at times provide insufficient information due to environmental factors affecting the sensor or the communication device.

One way to address this issue is to supplement the insufficient information provided by one sensor with information from other sensors. The supplemental information may be global navigation information, imaging information or mapping information. In one example, mapping information (e.g., high resolution mapping information, high definition mapping information, etc.) may be analyzed to determine curvature and slope information about a route of a vehicle. As such, the mapping information may be used in addition to sensor information, global navigation information, or information provided by communication devices of a vehicle to make a more accurate determination as to the position, location, and route of travel of the vehicle.

This more accurate determination as to the position, location, route, and/or route of travel of the vehicle may then be used to provide better navigation information, autonomous vehicle control, and map creation. In one example, an autonomous vehicle may better be able to steer the vehicle by determining a more accurate route along a road or highway.

FIG. 1 shows a block diagram of an apparatus that determines a route 100. As shown in FIG. 1, the apparatus that determines a route 100, according to an exemplary embodiment, includes a controller 101, a power supply 102, a storage 103, an output 104, a user input 106, a sensor 107, and a communication device 108. However, the apparatus that determines a route 100 is not limited to the aforementioned configuration and may be configured to include additional elements and/or omit one or more of the aforementioned elements. The apparatus that determines a route 100 may be implemented as part of a vehicle, as a standalone component, as a hybrid between an on vehicle and off vehicle device, or in another computing device.

The controller 101 controls the overall operation and function of the apparatus that determines a route 100. The controller 101 may control one or more of a storage 103, an output 104, a user input 106, a sensor 107, and a communication device 108 of the apparatus that determines a route 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the sensor 107, and the communication device 108 of the apparatus that determines a route 100. The information may be sent and received via a bus or network, or may be directly read or written to/from one or more of the storage 103, the output 104, the user input 106, the sensor 107, and the communication device 108 of the apparatus that determines a route 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the user input 106, the sensor 107, and the communication device 108, of the apparatus that determines a route 100. The power supply 102 may include one or more from among a battery, an outlet, a capacitor, a solar energy cell, a generator, a wind energy device, an alternator, etc.

The storage 103 is configured for storing information and retrieving information used by the apparatus that determines a route 100. The storage 103 may be controlled by the controller 101 to store and retrieve information received from the controller 101, the sensor 107, and/or the communication device 108. The information may include global navigation information, sensor information, mapping information (e.g., high-resolution mapping data), desired route information, steering control information, etc. The sensor information may include imaging information from an imaging sensor. The mapping information may include map data including an array of curvature information for 10 meter intervals in front of a vehicle. The steering control information include information output to steer a vehicle according to the determined route along a path. The storage 103 may also store the computer instructions configured to be executed by a processor to perform the functions of the apparatus that determines a route 100.

The global navigation information may include one or more from among GPS information, GLONASS information, BeiDou information, Compass information, IRNSS information and information from a wireless communication or satellite based navigation system. The global navigation information may also include a position determined from a global navigation signal (GNS). The GNS signal may be a GPS signal or other GNS signal. GNS systems may include GPS, GLONASS, BeiDou, Compass, IRNSS and/or any other wireless communication or satellite based navigation system.

The imaging information may include an image of an environment corresponding to the location of the vehicle, a path in front of a vehicle or sensor, or a path around a vehicle or sensor. The imaging information or mapping information may be used to determine curvature information of a path, a position of a path or road, a position of a vehicle relative to a path or road, a route of travel of a vehicle relative to a path or road. The curvature information may include one or more data points representing the trajectory and/or slope of a path, road, highway, etc. In one example, the mapping information or data may be include one or more from among three-dimensional point cloud information, mapping data compiled form an imaging sensor, and mapping data compiled from light imaging, detection and ranging sensor.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that determines a route 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc. The output 104 may also output steering control information or desired route information provided by the controller 101.

The output 104 may output notification including one or more from among an audible notification, a light notification, and a display notification. The notifications may indicate information on a position of a vehicle or a location of a vehicle. Moreover, the output 104 may output navigation information based on the position of a vehicle and/or a location of a vehicle. In one example, the output 104 may be a steering actuator configured to control steering of a vehicle. The controller may control the steering actuator based on a calculated desired route to steer the vehicle along the desired route.

The user input 106 is configured to provide information and commands to the apparatus that determines a route 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a steering wheel, a touchpad, etc. The user input 106 may be configured to receive a user input to acknowledge or dismiss the notification output by the output 104.

The sensor 107 may include one or more from among a plurality of sensors including a camera, a laser sensor, an ultrasonic sensor, an infrared camera, a LIDAR, a radar sensor, an ultra-short range radar sensor, an ultra-wideband radar sensor, and a microwave sensor. The sensor 107 may be configured to scan an area around a vehicle to detect and provide imaging information including an image of the area around the vehicle. The sensor 107 may be used to compile imaging information or mapping information or data may including three-dimensional point cloud information.

The communication device 108 may be used by the apparatus that determines a route 100 to communicate with various types of external apparatuses according to various communication methods. The communication device 108 may be used to send/receive information including the information on a location of a vehicle, global navigation information, image sensor information and the adjustment information or adjustment value, etc.

The communication device 108 may include various communication modules such as one or more from among a telematics unit, a broadcast receiving module, a near field communication (NFC) module, a GNS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GNS receiver is a module that receives a GNS signal from a GPS satellite or other navigation satellite or tower and that detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that determines a route 100 may be configured to activate fail operative steering in response to detecting an electronic power steering (EPS) failure, determine a length of a lane map fusion ring, calculate a desired route based on a line of lane map fusion ring if the determined length is greater than a first predetermined distance, and calculate the desired route based on offset information and heading information of lane map fusion ring and curvature information and curvature derivative information calculated from map data if the determined length is less than the first predetermined distance. In this case, the EPS failure may be detected by a sensor that detects a failure of the EPS or an actuator that turns one or more wheels of a vehicle to steer a vehicle.

The lane map fusion ring may be an algorithm that sets a center of a host lane or the lane being traveled on. The algorithm sets the center based on data from the sensor or camera and high resolution mapping information. In one example, the lane map fusion ring may set the center of the lane based on the equation:

$$y = C0 + C1x + C2x^2 + C3x^3,$$

where x is the distance in front of the vehicle in meters, y is the lateral offset of the lane at a given distance, and C0, C1, C2 and C3 are coefficients describing the center of a road or path. In a first example, the C2 coefficient may be curvature information determined by calculating an average curvature of map data for a second predetermined distance in front of a vehicle and dividing the average curvature in half. In a second example, the C3 coefficient may be curvature derivative information determined by calculating a slope of map data for the second predetermined distance in front of a vehicle and dividing the slope by six. The line of the lane map fusion ring may be or may represent the route that the vehicle is traveling. The second predetermined distance may be 60 meters.

The controller 101 of the apparatus that determines a route 100 may be further configured to calculate the desired route based on the curvature information by calculating an average curvature of map data for a second predetermined distance in front of a vehicle and dividing the average curvature in half and to calculate the curvature derivative information by calculating a slope of map data for a second predetermined distance in front of a vehicle and dividing the slope by six.

The controller 101 of the apparatus that determines a route 100 may also be configured to calculate the slope of the map data based on the equation:

$$\text{Slope} = \frac{N\Sigma XY - \Sigma X * \Sigma Y}{N\Sigma x^2 - (\Sigma x)^2},$$

where N is a number of points, x is a distance from the vehicle, and y is map curvature information.

The controller 101 of the apparatus that determines a route 100 may be configured to detect the EPS failure by performing at least one from among detecting a loss of communication with the EPS module and detecting that the EPS module is reporting an internal failure. In addition, the controller 101 of the apparatus that determines a route 100 may be further configured to detect the EPS failure by running a diagnostic to detect the EPS failure.

Figure 2:
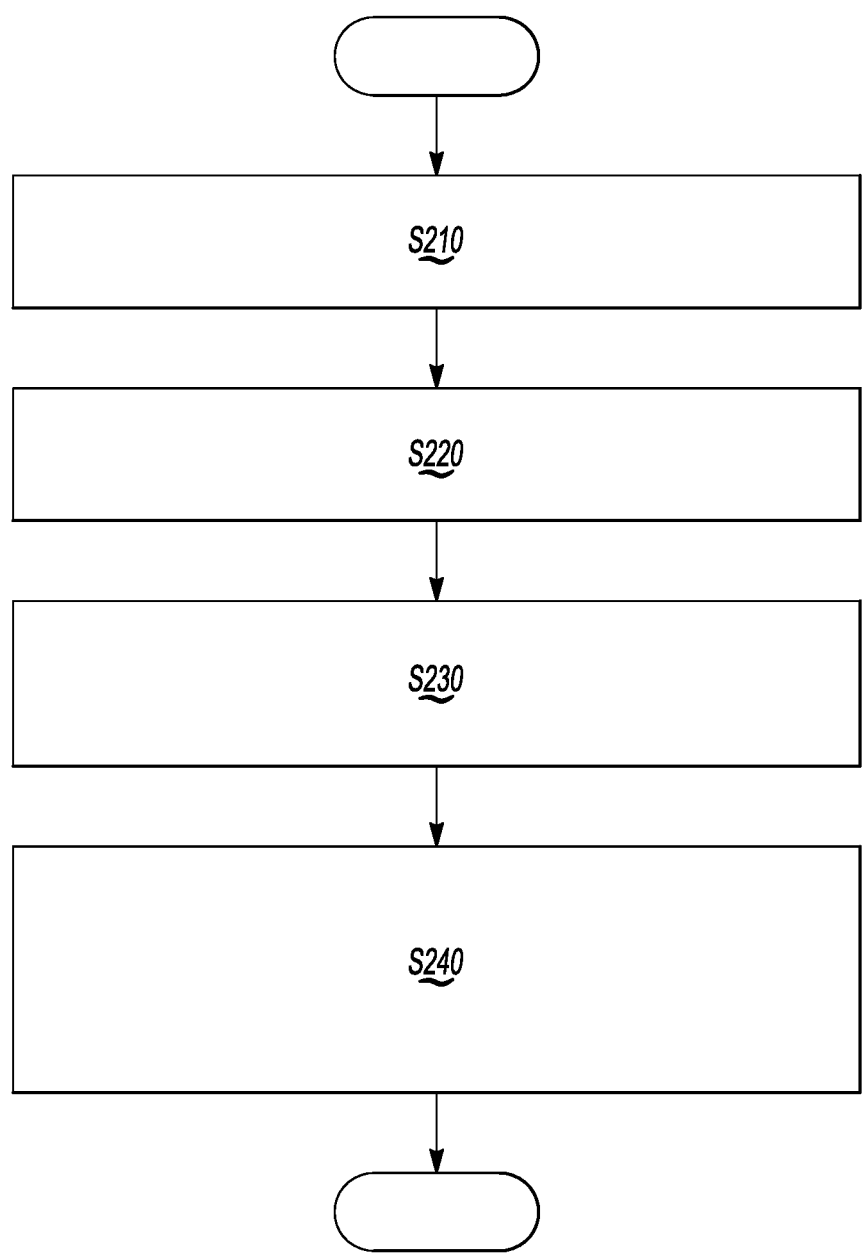
FIG. 2 shows a flowchart for a method of determining a route according to an exemplary embodiment.

FIG. 2 shows a flowchart for a method of determining a route according to an exemplary embodiment. The method of FIG. 2 may be performed by the apparatus that determines a route 100 or may be encoded into a computer readable medium as instructions that are executable by a computer to perform the method.

Referring to FIG. 2, fail operative steering is activated in response to detecting an EPS failure in operation S210. The EPS failure may be detected by detecting a loss of communication with the EPS module or detecting that the EPS module is reporting an internal failure.

The fail operative steering may be activated to control steering of a vehicle such as an automobile, motorcycle, truck, etc. In operation S220, a length of a lane map fusion ring is determined. If the determined length is greater than a first predetermined distance, the desired route is calculated based on a line of lane map fusion ring in operation S230. In this case, lane map fusion ring may be an algorithm that sets a center of a host lane or the lane being traveled on. The algorithm sets the center based on data from the sensor or camera and high resolution mapping information. In addition, the first predetermined distance may be 20 meters. If the determined length is less than the first predetermined distance, the desired route may be calculated based on offset information and heading information of lane map fusion ring as well as curvature information and curvature derivative information calculated from map data in operation S240.

The curvature information may be determined by calculating an average curvature of map data for a second predetermined distance in front of a vehicle and dividing the average curvature in half. The curvature derivative information may be determined by calculating a slope of map data for a second predetermined distance in front of a vehicle and dividing the slope by six. In one example, the slope of the map data is calculated based on the equation:

$$\text{Slope} = \frac{N\Sigma XY - \Sigma X * \Sigma Y}{N\Sigma x^2 - (\Sigma x)^2},$$

where N is a number of points, x is a distance from the vehicle, and y is map curvature information. Moreover, the curvature information and the curvature derivative information may include coefficients used to control steering of the vehicle determined by the calculations described herein.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for determining a route of a vehicle, the method comprising:
    activating, by at least one processor, fail operative steering in response to detecting an electronic power steering (EPS) failure, the fail operative steering comprising:
        determining, by at least one processor, a line defined by a lane map fusion ring algorithm, the lane map fusion ring algorithm setting a center of a lane being traveled on by the vehicle and a length of the line indicating a distance in front of the vehicle;
        calculating, by at least one processor, a desired route based on the line defined by the lane map fusion ring algorithm if the length is greater than a first predetermined distance;
        calculating, by at least one processor, the desired route based on offset information and heading information of the lane map fusion ring algorithm and curvature information and curvature derivative information calculated from map data, if the length is less than the first predetermined distance; and controlling a steering actuator according to the calculated desired route.

2. The method of claim 1, wherein the first predetermined distance is 20 meters.

3. The method of claim 1, wherein the calculating, by the at least one processor, the desired route comprises calculating the curvature information by calculating an average curvature of map data for a second predetermined distance in front of the vehicle and dividing the average curvature in half.

4. The method of claim 3, wherein the calculating, by the least one processor, the desired route comprises calculating the curvature derivative information by calculating a slope of map data for a second predetermined distance in front of the vehicle and dividing the slope by six.

5. The method of claim 4, wherein the map data comprises an array including curvature information for 10 meter intervals in front of the vehicle.

6. The method of claim 5, wherein the calculating the slope of the map data is performed based on an equation:

$$\text{Slope} = \frac{N\Sigma XY - \Sigma X * \Sigma Y}{N\Sigma x^2 - (\Sigma x)^2},$$

where N is a number of points, x is a distance in front of the vehicle, and y is map curvature information.

7. The method of claim 1, wherein the detecting, by the at least one processor, the EPS failure comprises at least one from among detecting a loss of communication with the EPS module and detecting that the EPS module is reporting an internal failure.

8. The method of claim 7, wherein the detecting, by the at least one processor, the EPS failure further comprises running a diagnostic to detect the EPS failure.

9. The method of claim 1, wherein the curvature information and the curvature derivative information comprise coefficients used to control steering of the vehicle.

10. A non-transitory computer readable medium comprising computer instructions executable to perform the method of claim 1.

11. An apparatus that determines a route, the apparatus comprising:
    a steering actuator;
    at least one memory comprising computer executable instructions; and
    at least one processor configured to read and execute the computer executable instructions, the computer executable instructions causing the at least one processor to:
    activate fail operative steering in response to detecting an electronic power steering (EPS) failure, the fail operative steering operable to:
        determine a line defined by a lane map fusion ring algorithm, the lane map fusion ring algorithm setting a center of a lane being traveled on by the vehicle and a length of the line indicating a distance in front of the vehicle;
        calculate a desired route based on the line defined by the lane map fusion ring algorithm if the length is greater than a first predetermined distance;
        calculate the desired route based on offset information and heading information of the line of the lane map fusion ring algorithm and curvature information and curvature derivative information calculated from map data, if the length is less than the first predetermined distance; and
        control the steering actuator according to the calculated desired route.

12. The apparatus of claim 11, wherein the first predetermined distance is 20 meters.

13. The apparatus of claim 11, wherein the computer executable instructions cause the at least one processor to calculate the desired route based on the curvature information by calculating an average curvature of map data for a second predetermined distance in front of the vehicle and dividing the average curvature in half.

14. The apparatus of claim 13, wherein the computer executable instructions cause the at least one processor to calculate the curvature derivative information by calculating a slope of map data for a second predetermined distance in front of the vehicle and dividing the slope by six.

15. The apparatus of claim 14, wherein the map data comprises an array including curvature information for 10 meter intervals in front of the vehicle.

16. The apparatus of claim 11, wherein the computer executable instructions cause the at least one processor to detect the EPS failure by at least one from among detecting a loss of communication with the EPS module and detecting that the EPS module is reporting an internal failure.

17. The apparatus of claim 16, wherein the computer executable instructions cause the at least one processor to detect the EPS failure by running a diagnostic to detect the EPS failure.

18. The apparatus of claim 11, wherein the curvature information and the curvature derivative information comprise coefficients used to control steering of a vehicle.

19. An apparatus that determines a route, the apparatus comprising:
    a steering actuator;
    at least one memory comprising computer executable instructions; and
    at least one processor configured to read and execute the computer executable instructions, the computer executable instructions causing the at least one processor to:
    activate fail operative steering in response to detecting an electronic power steering (EPS) failure, the fail operative steering operable to:
        determine a line defined by a lane map fusion ring algorithm, the lane map fusion ring algorithm setting a center of a lane being traveled on by the vehicle and a length of the line indicating a distance in front of the vehicle;
        calculate a desired route based on the line defined by the lane map fusion ring algorithm if the length is greater than a first predetermined distance;
        calculate the desired route based on offset information and heading information of the line of the lane map fusion ring algorithm and curvature information and curvature derivative information calculated from map data, if the length is less than the first predetermined distance; and
    control the steering actuator according to the calculated desired route,
    wherein the computer executable instructions cause the at least one processor to calculate the desired route based on the curvature information by calculating an average curvature of map data for a second predetermined distance in front of the vehicle and dividing the average curvature in half, wherein the computer executable instructions cause the at least one processor to calculate the curvature derivative information by calculating a slope of map data for a second predetermined distance in front of the vehicle and dividing the slope by six, wherein the map data comprises an array including curvature information for 10 meter intervals in front of the vehicle, and wherein the computer executable instructions cause the at least one processor to calculate the slope of the map data based on an equation:

$$\text{Slope} = \frac{N\Sigma XY - \Sigma X * \Sigma Y}{N\Sigma x^2 - (\Sigma x)^2},$$

where N is a number of points, x is a distance in front of the vehicle, and y is map curvature information.

* * * * *